US011371403B2

(12) United States Patent
Tabikh et al.

(10) Patent No.: US 11,371,403 B2
(45) Date of Patent: Jun. 28, 2022

(54) TEMPERING SYSTEM FOR GAS TURBINE SELECTIVE CATALYST REDUCTION SYSTEM

(71) Applicant: General Electric Technology GmbH, Baden (CH)

(72) Inventors: Ali Mustapha Tabikh, Vaxjo (SE); Jingchuan Zhou, Vaxjo (SE); Peter Lars Nilsson, Vaxjo (SE); Lars-Erik Johansson, Vaxjo (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 127 days.

(21) Appl. No.: 16/648,527

(22) PCT Filed: Sep. 6, 2018

(86) PCT No.: PCT/EP2018/074024
§ 371 (c)(1),
(2) Date: Mar. 18, 2020

(87) PCT Pub. No.: WO2019/057212
PCT Pub. Date: Mar. 28, 2019

(65) Prior Publication Data
US 2020/0284175 A1    Sep. 10, 2020

(30) Foreign Application Priority Data
Sep. 25, 2017   (EP) ..................................... 17192963

(51) Int. Cl.
*F01N 3/02*    (2006.01)
*F01D 25/30*   (2006.01)
(Continued)

(52) U.S. Cl.
CPC ............. *F01N 3/02* (2013.01); *F01D 25/305* (2013.01); *F01N 3/029* (2013.01); *F01N 3/0293* (2013.01);
(Continued)

(58) Field of Classification Search
CPC combination set(s) only.
See application file for complete search history.

(56) References Cited

U.S. PATENT DOCUMENTS 10,060,316 B2 *   8/2018   Reed ..................... F01N 3/2066
2010/0024379 A1   2/2010   Sengar et al.
(Continued)

FOREIGN PATENT DOCUMENTS

DE    10 2009 026240 A1    2/2010
EP       3 135 877 A1      3/2017
(Continued)

OTHER PUBLICATIONS

International Search Report of the International Searching Authority for PCT/EP2018/074024 dated Oct. 11, 2018.

*Primary Examiner* — Binh Q Tran
(74) *Attorney, Agent, or Firm* — Grogan, Tuccillo & Vanderleeden LLP

(57) ABSTRACT

A gas turbine engine system is equipped with a tempering system for a selective catalyst reduction system. The subject tempering system for a selective catalyst reduction system
(Continued)

comprises a tempering compartment equipped with a plurality of relatively high temperature environment self-supporting pipes, and optionally, a plurality of flow vanes.

20 Claims, 10 Drawing Sheets

(51) Int. Cl.
    *F01N 3/029*     (2006.01)
    *F01N 3/05*     (2006.01)
    *F01N 3/20*     (2006.01)
    *F01N 3/30*     (2006.01)
    *F01N 3/34*     (2006.01)
    *F02C 3/30*     (2006.01)

(52) U.S. Cl.
    CPC ............. *F01N 3/05* (2013.01); *F01N 3/2066* (2013.01); *F01N 3/30* (2013.01); *F01N 3/34* (2013.01); *F02C 3/30* (2013.01); *F01N 2240/20* (2013.01); *F01N 2270/02* (2013.01); *F01N 2610/00* (2013.01)

(56) References Cited

U.S. PATENT DOCUMENTS

| | | | |
|---|---|---|---|
| 2011/0158876 A1* | 6/2011 | Buzanowski | B01D 53/869 423/239.1 |
| 2014/0096532 A1* | 4/2014 | Broderick | F23J 15/02 60/774 |
| 2014/0230444 A1* | 8/2014 | Hao | F02C 6/08 60/772 |
| 2015/0000292 A1 | 1/2015 | Subramaniyan et al. | |
| 2015/0337700 A1 | 11/2015 | Miyanishi et al. | |
| 2016/0376956 A1 | 12/2016 | Kulkarni et al. | |
| 2017/0058742 A1* | 3/2017 | Zhang | F01D 25/305 |
| 2017/0182442 A1* | 6/2017 | Kippel | B01D 46/0086 |
| 2017/0252698 A1* | 9/2017 | Zhang | F01N 3/2892 |
| 2017/0254222 A1* | 9/2017 | Zhang | F02C 7/141 |

FOREIGN PATENT DOCUMENTS

| | | |
|---|---|---|
| EP | 3 214 278 A1 | 9/2017 |
| WO | 2014/039039 A1 | 3/2014 |

* cited by examiner

TEMPERING SYSTEM FOR GAS TURBINE SELECTIVE CATALYST REDUCTION SYSTEM

TECHNICAL FIELD

In general, the present disclosure relates to a gas turbine engine system equipped with a selective catalyst reduction system for combustion gas nitrogen oxides ($NO_x$) and/or carbon oxides ($CO_x$) reduction. More specifically, the present disclosure relates to a gas turbine engine system equipped with a tempering system for combustion gas temperature reduction prior to combustion gas nitrogen oxides ($NO_x$) and/or carbon oxides ($CO_x$) reduction in a selective catalyst reduction system.

BACKGROUND

In the combustion process of a gas turbine engine, combustion gas is generated comprising nitrogen oxides ($NO_x$), and other types of regulated emissions. One solution to reduce combustion gas nitrogen oxides emissions is to treat the combustion gas using a selective catalyst reduction system. Generally, to reduce nitrogen oxides emissions, a selective catalyst reduction system adds a reducing agent, typically ammonia or urea, to the gas turbine engine generated combustion gas before passing the combustion gas through a catalyst bed containing a catalyst. The catalyst in the catalyst bed selectively adsorbs the nitrogen oxides and the added reducing agent. The adsorbed nitrogen oxides and reducing agent undergo a chemical reaction on the catalyst surface with the produced reaction products desorbed. More specifically, the reducing agent reacts with the nitrogen oxides in the combustion gas to form water and nitrogen.

The overall efficiency of a selective catalyst reduction system may depend in part on combustion gas temperature. An efficient temperature range for treatment of combustion gas to reduce combustion gas nitrogen oxides emissions in the selective catalyst reduction system may be relatively narrow. As such, the combustion gas generated in the gas turbine engine generally should be cooled before reaching the catalyst. Moreover, the combustion gas should reach an even temperature profile upstream of the catalyst.

SUMMARY OF THE DISCLOSURE

Disclosed herein is a gas turbine engine system equipped with a tempering system upstream of a selective catalyst reduction system. The subject tempering system arranged upstream of the selective catalyst reduction system comprises a tempering compartment equipped with at least one arrangement pair comprising a first pipe arrangement, a second pipe arrangement, and a mix area in a distance between the first pipe arrangement and the second pipe arrangement. The first pipe arrangement and the second pipe arrangement each comprise relatively high temperature environment self-supporting pipes. In some embodiments, the first pipe arrangement and the second pipe arrangement comprise a plurality of flow vanes. Only one arrangement pair with a first pipe arrangement and a second pipe arrangement are described and illustrated throughout the subject disclosure for purposes of simplicity and clarity, not limitation. As such, the subject tempering compartment may be equipped with one to twenty or more arrangement pairs depending upon operational requirements of the associated selective catalyst reduction system. Within the tempering compartment, a supply of tempering fluid, such as air, cools combustion gas generated by a gas turbine of the gas turbine engine system, and mixes with the combustion gas to produce a relatively cooler mixed gas of a relatively uniform temperature profile across a cross-section of the tempering compartment. The relatively cooler mixed gas of relatively uniform temperature profile then flows from the tempering compartment, into the associated selective catalyst reduction system.

Also disclosed herein is a method of using a gas turbine engine system equipped with a tempering system upstream of a selective catalyst reduction system to cool combustion gas prior to selective catalyst reduction system treatment for combustion gas pollutant reduction. The method comprises supplying a combustion gas generated by a gas turbine engine to a tempering system comprising a tempering compartment equipped with at least one arrangement pair comprising a first pipe arrangement, a second pipe arrangement, and a mix area in a distance between the first pipe arrangement and the second pipe arrangement. The first pipe arrangement and the second pipe arrangement comprise relatively high temperature environment self-supporting pipes, and in some embodiments, a plurality of flow vanes arranged within each the first pipe arrangement and the second pipe arrangement. The first pipe arrangement and the second pipe arrangement supply a tempering fluid, such as air, to combustion gas flowing through the tempering compartment. The first pipe arrangement and the second pipe arrangement also divert the flow of tempering fluid and combustion gas within the tempering compartment, with or without the presence of a plurality of flow vanes, to produce a relatively cooler mixed gas of a relatively uniform temperature profile across a cross-section of the tempering compartment. From the tempering system, the relatively cooler mixed gas of relatively uniform temperature profile is supplied to the associated downstream selective catalyst reduction system comprising a catalyst for treatment of the relatively cooler mixed gas for pollutant reduction.

In summary, the subject gas turbine engine system comprises a gas turbine engine, a tempering system comprising a tempering compartment comprising an inlet, an outlet, at least one arrangement pair comprising a first pipe arrangement and a second pipe arrangement spaced a distance apart, a mix area in the distance between the first pipe arrangement and the second pipe arrangement, with the first pipe arrangement comprising a first plurality of pipes, with the second pipe arrangement comprising a second plurality of pipes, and one or more openings in each pipe of the first plurality of pipes and the second plurality of pipes, and a selective catalytic reduction system. The subject gas turbine engine system further comprises flow vanes arranged within the first pipe arrangement, and a tempering fluid supply operable to supply a tempering fluid to the tempering compartment via the plurality of openings. In an embodiment of the subject gas turbine engine system, the first pipe arrangement is arranged horizontally extending between opposed side walls of the tempering compartment. In another embodiment of the subject gas turbine engine system, the first pipe arrangement is arranged vertically extending from a bottom to a top of the tempering compartment. According to the subject gas turbine engine system, one or more openings supply a tempering fluid to the tempering compartment in a plurality of directions. In an embodiment of the subject system, flow vanes are arranged within the first pipe arrangement and arranged within the second pipe arrangement. Also, according to an embodiment of the subject system, the one or more openings are arranged along an entire length of the pipes, in a first end region of the pipes, in a middle region of the pipes, in a second end region of the pipes, or a combination thereof.

In summary, a method of using a gas turbine engine system comprises supplying a polluted combustion gas comprising a pollutant content generated by a gas turbine engine to a downstream tempering system, the tempering system comprising a tempering compartment comprising an inlet, an outlet, at least one arrangement pair comprising a first pipe arrangement and a second pipe arrangement spaced a distance apart, a mix area in the distance between the first pipe arrangement and the second pipe arrangement, with the first pipe arrangement comprising a first plurality of pipes, with the second pipe arrangement comprising a second plurality of pipes, and one or more openings in each pipe of the first plurality of pipes and the second plurality of pipes, supplying a tempering fluid to the polluted combustion gas within the tempering compartment via the one or more openings to obtain a reduced temperature mixed gas, and supplying the reduced temperature mixed gas to a downstream selective catalytic reduction system to obtain a treated gas of a reduced pollutant content as compared to that of the polluted combustion gas. Also, according to the subject method, flow vanes are arranged within the first pipe arrangement, or flow vanes are arranged within both the first pipe arrangement and the second pipe arrangement. The tempering fluid according to the subject method is air or cooled air. Also, according to the subject method, the first pipe arrangement is arranged horizontally to extend between opposed side walls of the tempering compartment, or the first pipe arrangement is arranged vertically to extend from a bottom to a top of the tempering compartment. Further according to the subject method, the one or more openings supply the tempering fluid to the tempering compartment in a plurality of directions. The one or more openings are arranged along an entire length of the pipes, in a first end region of the pipes, in a middle region of the pipes, in a second end region of the pipes, or in a combination thereof.

DETAILED DESCRIPTION

Figure 1:
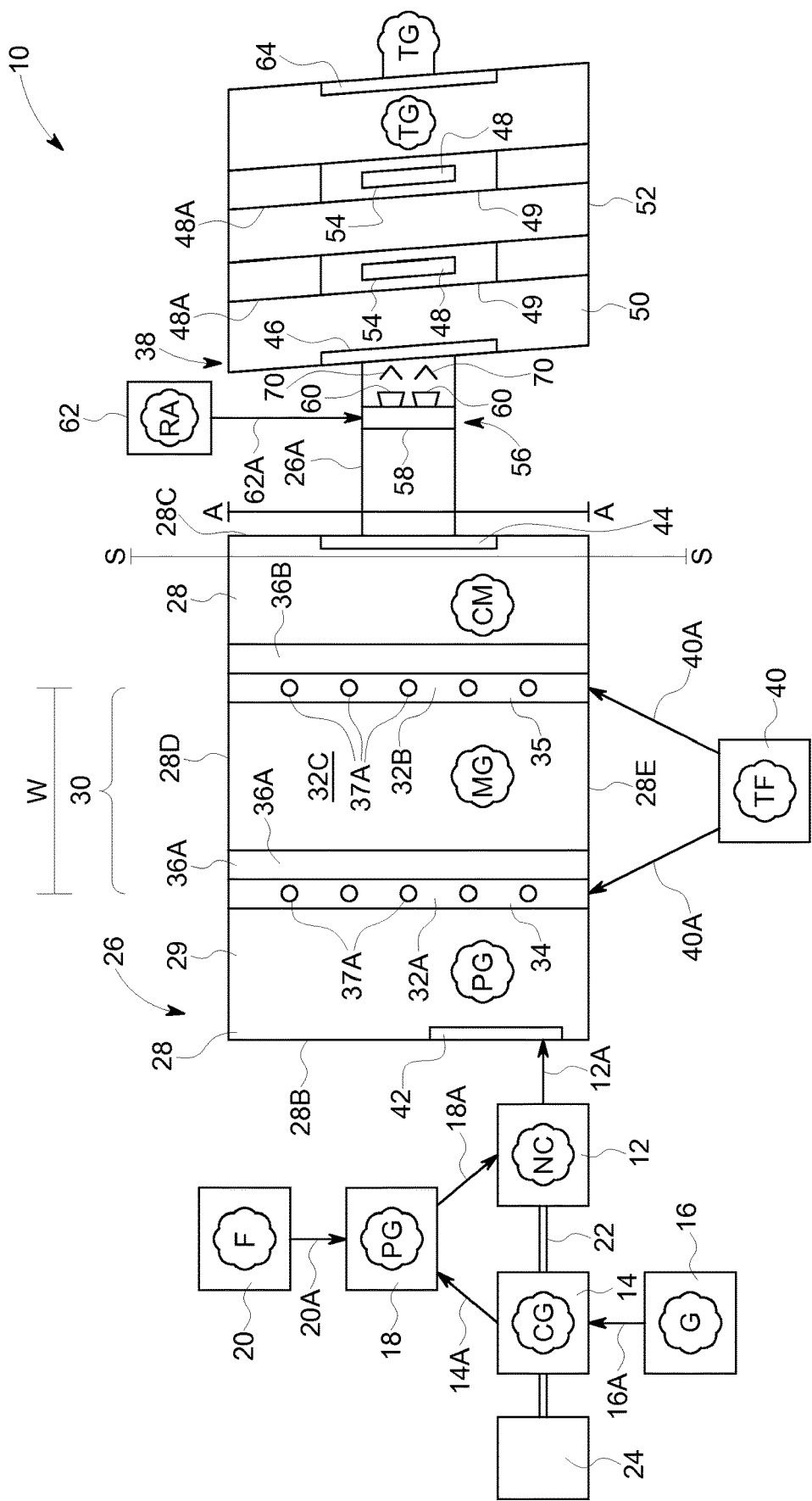
FIG. 1 is a schematic side cross sectional view of a gas turbine engine system equipped with a tempering system and a selective catalytic reduction system according to the subject disclosure.

Referring now to the above described FIGS. 1 through 10, like reference numerals provided in the figures refer to like elements. Illustrated in FIG. 1 is a gas turbine engine system 10. As such, the gas turbine engine system 10 comprises a gas turbine engine 12, a tempering system 26 and a selective catalytic reduction system 38. The gas turbine engine 12 comprises a compressor 14, gas supply 16, combustor 18, fuel supply 20, shaft 22, and external load 24. The compressor 14 of the gas turbine engine 12 compresses a gas G, such as for example air, supplied to the compressor 14 from the gas supply 16 via fluidly connected duct 16A, to generate a compressed gas CG. The compressed gas CG flows from compressor 14 to the combustor 18 via fluidly connected duct 14A. Within the combustor 18, the supplied compressed gas CG is mixed with a pressurized flow of fuel F supplied to the combustor 18 from fuel supply 20 via fluidly connected duct 20A. Fuel F may be natural gas, various types of syngas, liquid fuels, or other fuels and/or blends thereof. The mixed compressed gas CG and fuel F are ignited within the combustor 18, with a polluted combustion gas PG generated by the combustion. The generated polluted combustion gas PG comprises nitrogen oxides ($NO_x$), carbon oxides ($CO_x$), and like pollutants. From the combustor 18, the polluted combustion gas PG is supplied to the gas turbine engine 12 via duct 18A. The supplied polluted combustion gas PG drives the gas turbine engine 12 to produce mechanical work MW. The mechanical work MW of gas turbine engine 12 drives the compressor 14 via a shaft 22, as well as driving an external load 24. External load 24 may be an electrical generator or the like equipment.

Figure 2:
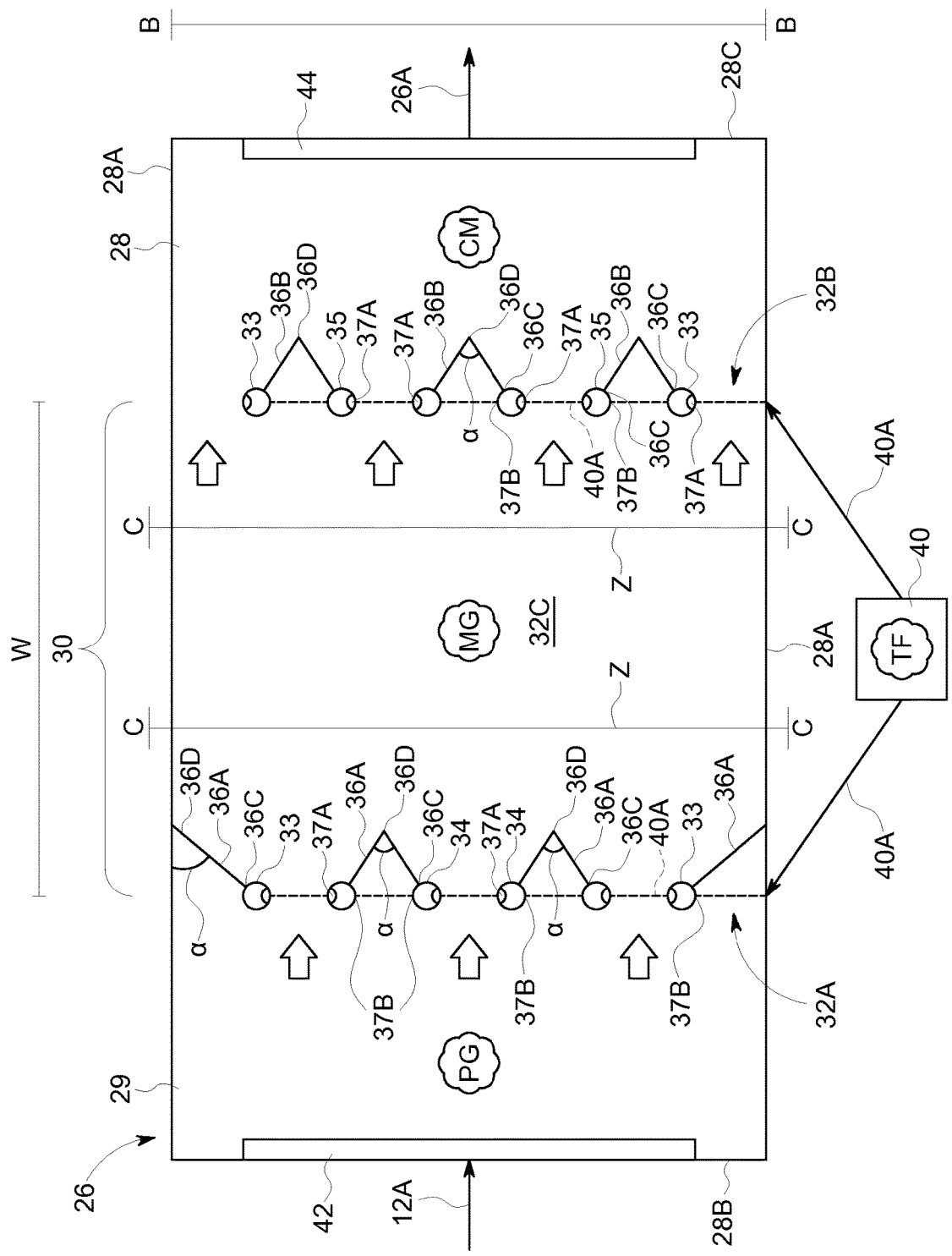
FIG. 2 is a schematic top cross sectional view of a first embodiment of the tempering system of FIG. 1.
Figure 3:
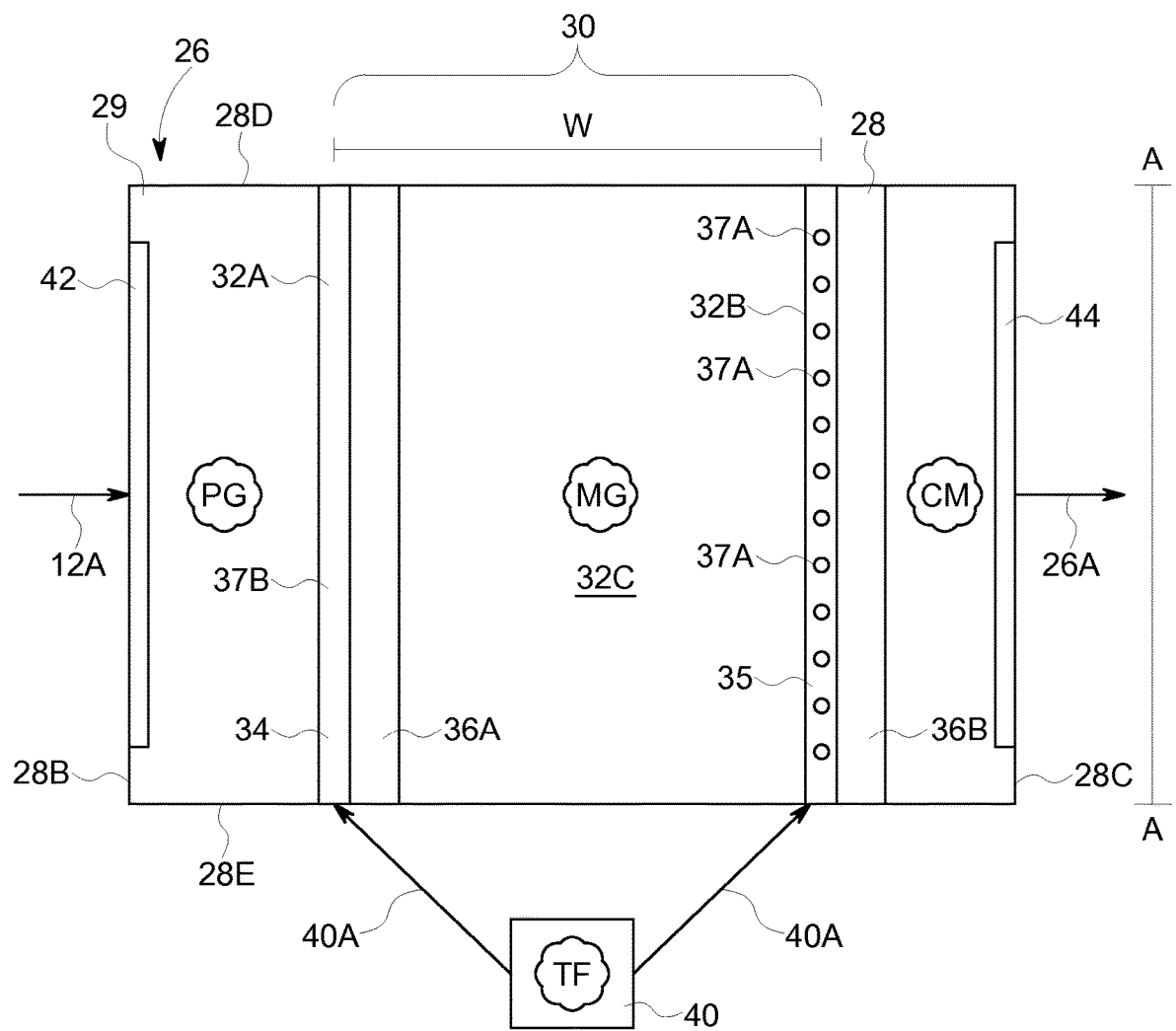
FIG. 3 is a schematic side cross sectional view of the first embodiment of the tempering system of FIG. 2.
Figure 4:
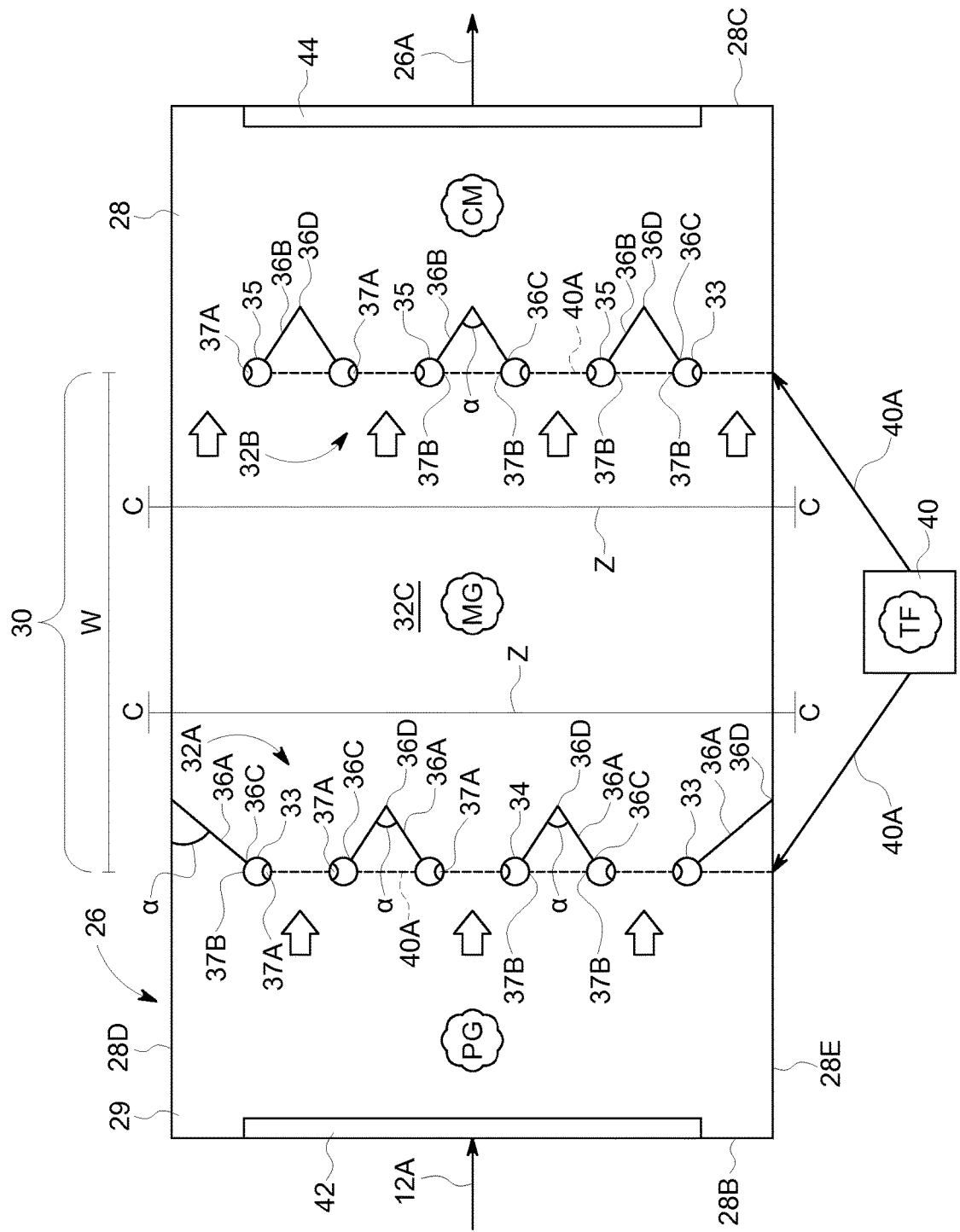
FIG. 4 is a schematic side cross sectional view of a variation of the first embodiment of the tempering system of FIG. 2.

Fluidly connected to gas turbine engine 12 via duct 12A is a tempering system 26. A first embodiment of the tempering system 26, as illustrated in FIGS. 2 through 4, comprises a tempering compartment 28 comprising opposed side walls 28A unitarily formed with or attached between inlet wall 28B, outlet wall 28C, top 28D and bottom 28E, together defining an interior area 29. Interior area 29 is equipped with at least one arrangement pair 30 comprising a first pipe arrangement 32A and a second pipe arrangement 32B spaced a distance W apart to allow for fluid mixing in a relatively turbulent mix area 32C therebetween. The first pipe arrangement 32A comprises a first plurality of pipes 34 with one or more openings 37A and the second pipe arrangement 32B comprises a second plurality of pipes 35 with one or more openings 37A. The first plurality of pipes 34 and the second plurality of pipes 35 each comprise relatively high temperature environment self-supporting pipes 34, 35 of circular, square, triangular or other geometry, although circular is illustrated. According to the embodiment illustrated in FIGS. 2 through 4, a first plurality of flow vanes 36A are arranged in cooperation with the first plurality of pipes 34, and a second plurality of flow vanes 36B are arranged in cooperation with the second plurality of pipes 35. Each the first plurality of flow vanes 36A with the first plurality of pipes 34, and the second plurality of flow vanes 36B with the second plurality of pipes 35, block about 10 percent to about 70 percent of areas Z of cross sections C of the interior area 29 in which arranged. The first plurality of flow vanes 36A, and the second plurality of flow vanes 36B may be configured in the shape of the letter "V", with an angle α of about 5 degrees to about 90 degrees with respect to the general flow of polluted combustion gas PG through interior area 29. As such, ends 36C of each the first plurality of flow vanes 36A and the second plurality of flow vanes 36B are upstream of the apexes 36D of each the first plurality of flow vanes 36A and the second plurality of flow vanes 36B. Further, the first plurality of flow vanes 36A and the second plurality of flow vanes 36B are not aligned meaning the second plurality of flow vanes 36B are downstream of but not directly behind the first plurality of flow vanes 36A. According to this embodiment illustrated in FIGS. 2 and 3, each the first plurality of pipes 34, the second plurality of pipes 35, the first plurality of flow vanes 36A, and the second plurality of flow vanes 36B are arranged with a longitudinal axis A-A extending vertically, i.e., from bottom 28E to top 28D of tempering compartment 28, and hence generally perpendicular with respect to the flow of polluted combustion gas PG through the tempering compartment 28. According to a variation of this embodiment illustrated in FIG. 4, each the first plurality of pipes 34, the second plurality of pipes 35, the first plurality of flow vanes 36A, and the second plurality of flow vanes 36B are arranged with a longitudinal axis B-B extending horizontally, i.e., from one opposed side wall 28A to the other opposed side wall 28A of tempering compartment 28 (best illustrated in FIG. 2), and hence generally perpendicular with respect to the flow of polluted combustion gas PG through the tempering compartment 28. Illustrated in FIGS. 2 and 3, each the first plurality of pipes 34 of the first pipe arrangement 32A and the second plurality of pipes 35 of the second pipe arrangement 32B comprise two end pipes 33. Each end pipe 33 is arranged adjacent to an opposed side wall 28A. Likewise, illustrated in FIG. 4, each the first plurality of pipes 34 of the first pipe arrangement 32A and the second plurality of pipes 35 of the second pipe arrangement 32B comprise two end pipes 33. Each end pipe 33 is arranged adjacent to either bottom 28E or top 28D. Further according to the subject disclosure, the subject tempering compartment 28 may be equipped with one to twenty or more arrangement pairs 30 depending upon operational requirements of an associated downstream, with respect to the flow of polluted combustion gas PG through the gas turbine engine system 10, selective catalyst reduction system 38. However, only one arrangement pair 30 is illustrated in FIGS. 2 through 4 for purposes of simplicity and clarity, not limitation.

The plurality of relatively high temperature environment self-supporting pipes 34, 35 are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto. Pipes 34, 35 may be varied in size based on the tempering fluid TF requirements for optimal operation of the selective catalyst reduction system 38. Openings 37A in pipes 34, 35 may be sized and shaped, such as circular, square, triangular, or any other geometry, for achieving tempering fluid TF requirements for optimal operation of the selective catalyst reduction system 38. Likewise, each of openings 37A may be the same or differ operable to inject tempering fluid TF in a single direction or in multiple directions within interior area 29 depending on tempering fluid TF requirements for optimal operation of the selective catalyst reduction system 38. Preferably, tempering fluid TF is injected from openings 37A generally perpendicular to the flow of polluted combustion gas PG through the tempering compartment 28.

The plurality of flow vanes 36A, 36B are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto.

The tempering compartment 28 is supplied tempering fluid TF, such as ambient air, chilled air or the like from a tempering fluid supply 40 via fluidly connected duct 40A fluidly connected to pipes 34, 35 of first pipe arrangement 32A and second pipe arrangement 32B. Tempering fluid supply 40 may be a fan or pump supplying ambient air as a tempering fluid TF. Alternatively, tempering fluid supply 40 may be a heat exchanger or cooling system that generates cooled or chilled air supplied as a tempering fluid TF. Within the tempering compartment 28, supplied tempering fluid TF flows through pipes 34, 35 and injected into the interior area 29 from the one or more openings 37A along sides 37B of pipes 34, 35. Preferably, according to the subject embodiment, within the first pipe arrangement 32A and the second pipe arrangement 32B, openings 37A alternate sides 37B of the pipes 34, 35, so that openings 37A are arranged on opposite sides 37B of adjacent pipes 34, 35. By openings 37A alternating sides 37B of adjacently arranged pipes 34, 35, adjacent openings 37A are arranged "facing" or "opposing" one another. Also, facing or opposing openings 37A may be the same or differ, inject in a single direction or multiple directions, and/or aligned or offset one from another. Abutting or affixed to sides 37B of adjacent pipes 34, 35 opposite openings 37A are flow vanes 36A, 36B. Likewise, a flow vane 36A, 36B abuts or is affixed between sides 37B of end pipes 33 and tempering air compartment 28 opposed side walls 28A (FIGS. 2 and 3) or top 28D and bottom 28E (FIG. 4).

Polluted combustion gas PG having a pollutant content NC flows from duct 12A through inlet 42 in inlet wall 28B into interior area 29 of tempering compartment 28 of tempering system 26. Polluted combustion gas PG entering tempering compartment 28 through inlet 42 is relatively hot having a temperature ranging to about 650° C. Flow of this relatively hot polluted combustion gas PG through the tempering compartment 28 is diverted by flow vanes 36A causing the relatively hot polluted combustion gas PG to flow between adjacent parallel pipes 34 of the first pipe arrangement 32A of the arrangement pair 30. Openings 37A of pipes 34 supply tempering fluid TF to the tempering compartment 28 and hence to the relatively hot polluted combustion gas PG flowing between the pipes 34. The tempering fluid TF supplied to the tempering compartment 28 via openings 37A cools the relatively hot polluted combustion gas PG and mixes further with the polluted combustion gas PG in the relatively turbulent mix area 32C to produce a polluted mixed gas MG having a reduced temperature, in some systems 10 ranging from about 500° C. to about 600° C. Flow of the polluted mixed gas MG through the tempering compartment 28 downstream the first pipe arrangement 32A of the arrangement pair 30, is again diverted by flow vanes 36B causing the polluted mixed gas MG to flow between adjacent pipes 35 of the second pipe arrangement 32B. Openings 37A of the pipes 35 supply tempering fluid TF to the tempering compartment 28 and hence to the polluted mixed gas MG flowing between the adjacent, parallel pipes 35. The tempering fluid TF supplied to the tempering compartment 28 via openings 37A in pipes 35 cools the polluted mixed gas MG and mixes with the polluted mixed gas MG to produce a cooler mixed gas CM having a temperature ranging from about 350° C. to about 500° C. The cooler mixed gas CM downstream of the second pipe arrangement 32B, is of a relatively uniform temperature profile across a cross-section S-S of the tempering compartment 28 parallel to outlet wall 28C and perpendicular with respect to the general flow of polluted combustion gas PC/polluted mixed gas MG/cooler mixed gas CM through the tempering compartment 28 from inlet 42 to outlet 44. Achieving the cooler mixed gas CM of relatively uniform temperature profile is facilitated by the pipes 34, 35 and plurality of flow vanes 36A, 36B arranged spaced a distance W apart to allow for fluid mixing in the relatively turbulent mix area 32C therebetween. With the plurality of flow vanes 36A, 36B arranged along each side 37B of each pipe 34, 35 opposite openings 37A and along opposed side walls 28A, the polluted combustion gas PC/polluted mixed gas MG flow is diverted thereby generating a thorough mixing and forcing polluted combustion gas PC/polluted mixed gas MG flow relatively exclusively between pipes 34, 35 past openings 37A with tempering fluid TF flowing therefrom. The resultant cooler mixed gas CM of relatively uniform temperature profile flows from outlet 44 of tempering compartment 28 via fluidly connected duct 26A into inlet 46 of associated selective catalyst reduction system 38.

In accordance with the subject disclosure, the selective catalyst reduction system 38 comprises one or more catalyst beds 48A equipped with a catalyst 48 arranged within an interior area 50 defined by a housing 52 having an inlet 46 and an outlet 64. Cooler mixed gas CM flowing into inlet 46 of the selective catalyst reduction system 38 housing 52 contacts surface 54 of catalyst 48. The catalyst 48 may be of a conventional commercially available material, such as vanadium oxide ($V_2O_5$) and/or titanium dioxide ($TiO_2$). The catalyst 48 may exist as a homogeneous structure entirely of catalyst material, or as a heterogenous catalytic coating supported on a mechanically strong but catalytically inert structure or support 49. The catalyst 48 may be of any suitable size, shape, or configuration. Further, an injection system 56 may be positioned upstream of the catalyst 48, such as for example, within duct 26A adjacent inlet 46. Injection system 56 comprises piping 58 equipped with nozzles 60 and a static mixer 70. Fluidly connected to piping 58 is a reductant supply 62. Reductant supply 62 supplies a reducing agent RA such as for example ammonia and/or urea to piping 58 via pipe 62A. From piping 58, reducing agent RA is injected by nozzles 60 into the cooler mixed gas CM. Downstream with respect to the flow of the cooler mixed gas CM from the nozzles 60, is a static mixer 70. Static mixer 70 is configured for mixing the reducing agent RA with the cooler mixed gas CM for an even distribution of the reducing agent RA throughout the cooler mixed gas CM prior to the cooler mixed gas CM entering into inlet 46 of the selective catalyst reduction system 38 housing 52. The catalyst 48 selectively adsorbs nitrogen oxides and the supplied reducing agent RA from the cooler mixed gas CM, thereby producing treated gas TG of a reduced pollutant content NC, e.g., reduced nitrogen oxides, as compared to that of the cooler mixed gas CM. The adsorbed nitrogen oxides and reducing agent RA undergo a chemical reaction on surface 54 of catalyst 48 with the produced reaction products desorbed. More specifically, the reducing agent RA reacts with the nitrogen oxides in the cooler mixed gas CM to form water and nitrogen. The produced treated gas TG flows out of housing 52 via outlet 64 for further treatment or for environmentally conservative release to the atmosphere.

Figure 5:
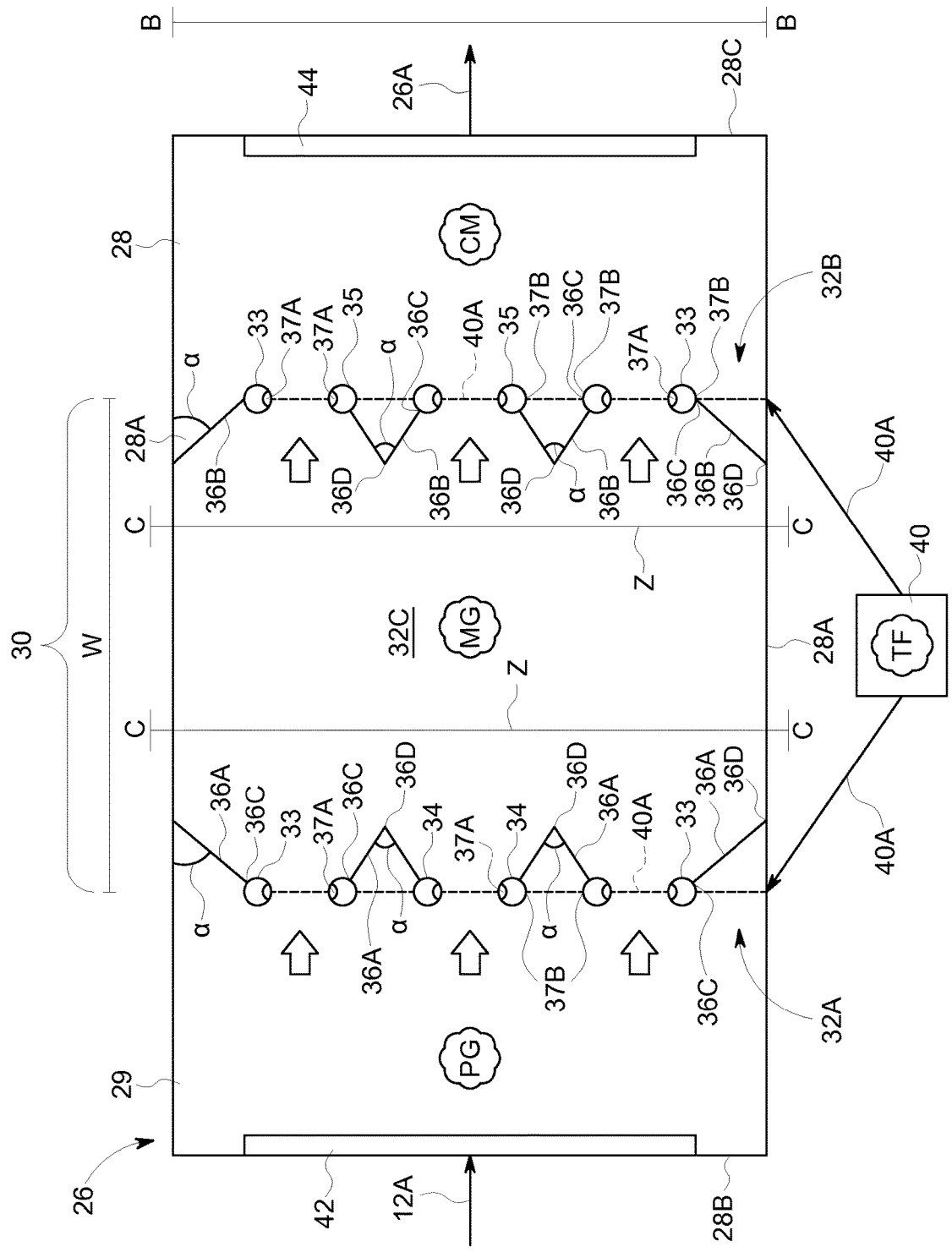
FIG. 5 is a schematic top cross sectional view of a second embodiment of the tempering system of FIG. 1.
Figure 6:
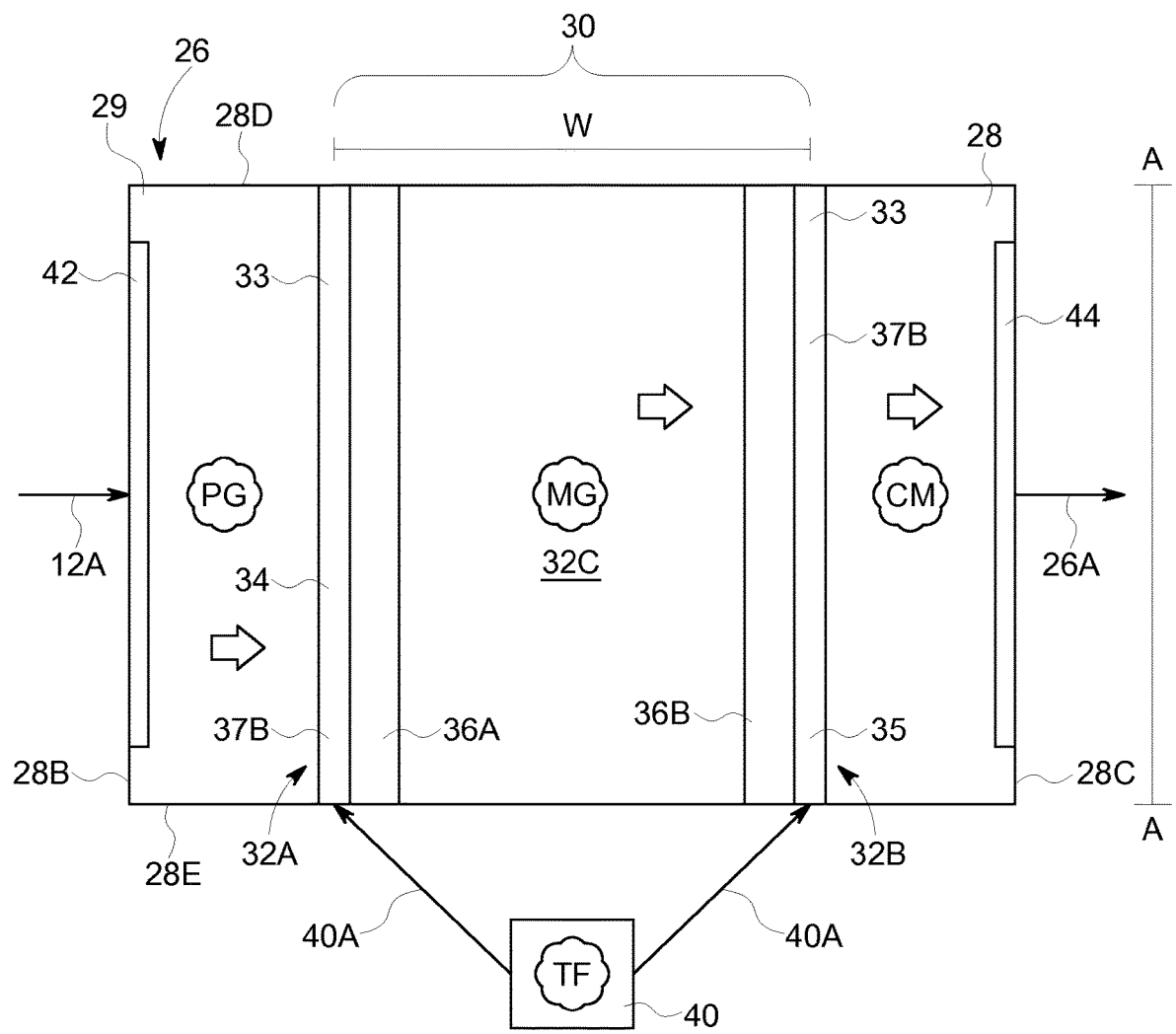
FIG. 6 is a schematic side cross sectional view of the second embodiment of the tempering system of FIG. 5.
Figure 7:
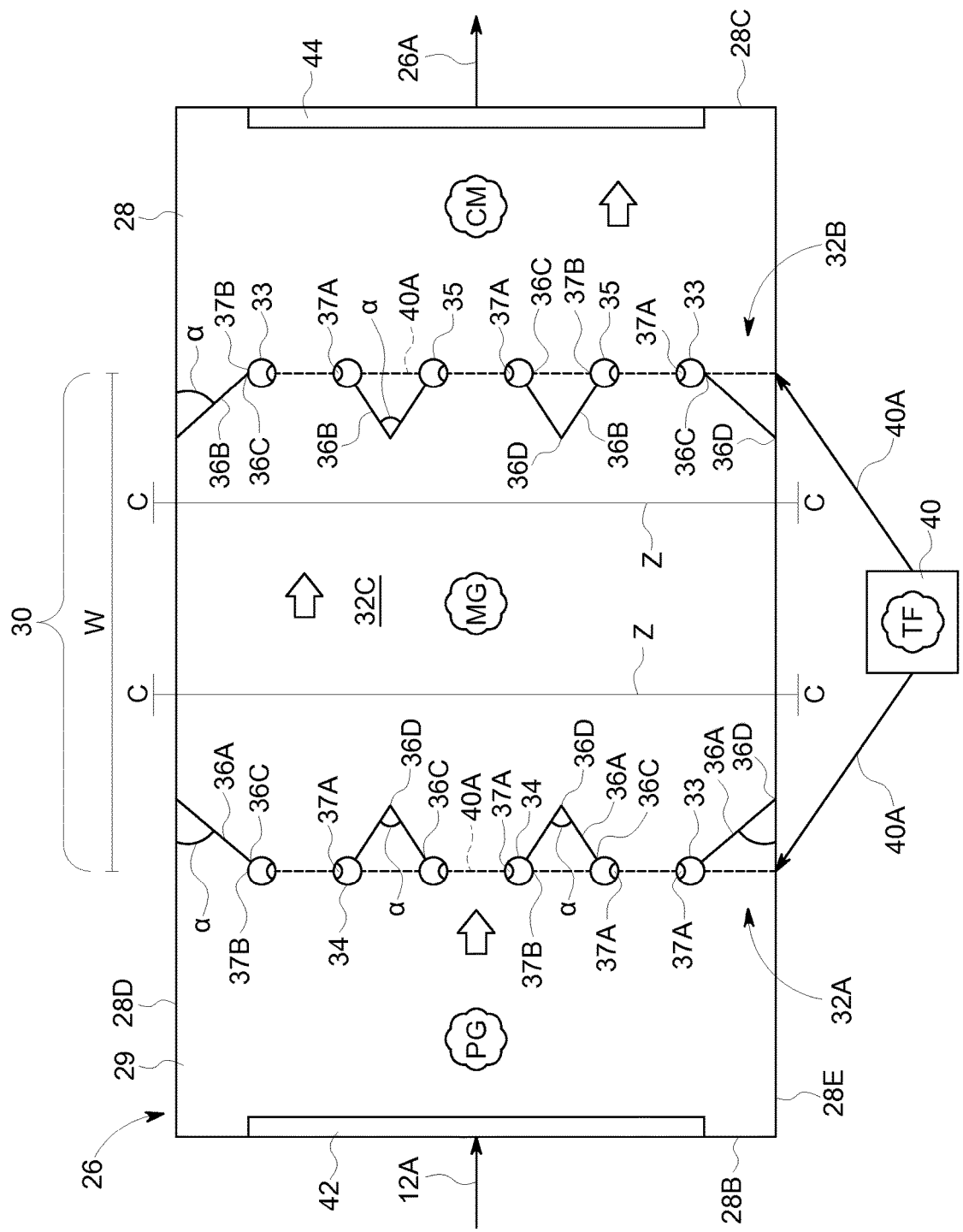
FIG. 7 is a schematic side cross sectional view of a variation of the second embodiment of the tempering system of FIG. 5.

A second embodiment of the subject tempering system 26, as illustrated in FIGS. 5 through 7, comprises a tempering compartment 28 comprising opposed side walls 28A unitarily formed with or attached between inlet wall 28B, outlet wall 28C, top 28D and bottom 28E, together defining an interior area 29. Interior area 29 is equipped with at least one arrangement pair 30 comprising a first pipe arrangement 32A and a second pipe arrangement 32B spaced a distance W apart to allow for fluid mixing in a relatively turbulent mix area 32C therebetween. The first pipe arrangement 32A comprises a first plurality of pipes 34 with one or more openings 37A and the second pipe arrangement 32B comprises a second plurality of pipes 35 with one or more openings 37A. The first plurality of pipes 34 and the second plurality of pipes 35 each comprise relatively high temperature environment self-supporting pipes 34, 35 of circular, square, triangular or other geometry, although circular is illustrated. According to the embodiment illustrated in FIGS. 5 and 6, a first plurality of flow vanes 36A are arranged in cooperation with the first plurality of pipes 34, and a second plurality of flow vanes 36B are arranged in cooperation with the second plurality of pipes 35. Each the first plurality of flow vanes 36A with the first plurality of pipes 34, and the second plurality of flow vanes 36B with the second plurality of pipes 35, block about 10 percent to about 70 percent of areas Z of cross sections C of the interior area 29 in which arranged. The first plurality of flow vanes 36A, and the second plurality of flow vanes 36B may be configured in the shape of the letter "V", with an angle $\alpha$ of about 5 degrees to about 90 degrees with respect to the general flow of polluted combustion gas PG through the interior area 29. As such, ends 36C of each the first plurality of flow vanes 36A are upstream of the apexes 36D. Conversely, ends 36C of each of the second plurality of flow vanes 36B are downstream of the apexes 36D. Hence, according to the subject disclosure, the first pipe arrangement 32A and the second pipe arrangement 32B within an arrangement pair 30 may be the same or differ depending on tempering fluid TF requirements for optimal operation of the selective catalyst reduction system 38. Likewise, arrangement pairs 30 within the tempering compartment 28 may be the same or differ depending on tempering fluid TF requirements for optimal operation of the selective catalyst reduction system 38. Further, the first plurality of flow vanes 36A and the second plurality of flow vanes 36B are aligned meaning the second plurality of flow vanes 36B are downstream and directly behind the first plurality of flow vanes 36A. According to this embodiment, each the first plurality of pipes 34, the second plurality of pipes 35, the first plurality of flow vanes 36A, and the second plurality of flow vanes 36B are arranged with a longitudinal axis A-A extending vertically, i.e., from bottom 28E to top 28D of tempering compartment 28, and hence generally perpendicular with respect to the flow of polluted combustion gas PG through the tempering compartment 28. According to a variation of this embodiment illustrated in FIG. 7, each the first plurality of pipes 34, the second plurality of pipes 35, the first plurality of flow vanes 36A, and the second plurality of flow vanes 36B are arranged with a longitudinal axis B-B (best illustrated in FIG. 5) extending horizontally, i.e., from one opposed side wall 28A to the other opposed side wall 28A of tempering compartment 28, and hence generally perpendicular with respect to the flow of polluted combustion gas PG through the tempering compartment 28. Illustrated in FIGS. 5 and 6, each the first plurality of pipes 34 of the first pipe arrangement 32A and the second plurality of pipes 35 of the second pipe arrangement 32B comprise two end pipes 33. Each end pipe 33 is arranged adjacent to an opposed side wall 28A. Likewise, illustrated in FIG. 7, each the first plurality of pipes 34 of the first pipe arrangement 32A and the second plurality of pipes 35 of the second pipe arrangement 32B comprise two end pipes 33. Each end pipe 33 is arranged adjacent to either bottom 28E or top 28D. Further according to the subject disclosure, the subject tempering compartment 28 may be equipped with one to twenty or more arrangement pairs 30 depending upon operational requirements of an associated downstream, with respect to the flow of polluted combustion gas PG through the gas turbine engine system 10, selective catalyst reduction system 38. However, only one arrangement pair 30 is illustrated in FIGS. 5 through 7 for purposes of simplicity and clarity, not limitation.

The plurality of relatively high temperature environment self-supporting pipes 34, 35 are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto. Pipes 34, 35 may be varied in size based on the tempering fluid TF requirements for optimal operation of the selective catalyst reduction system 38. Openings 37A in pipes 34, 35 may be sized and shaped, such as circular, square, triangular, or any other geometry, for achieving tempering fluid TF requirements for optimal operation of the selective catalyst reduction system 38. Likewise, each of openings 37A may be the same or differ operable to inject tempering fluid TF in a single direction or in multiple directions within interior area 29 depending on tempering fluid TF requirements for optimal operation of the selective catalyst reduction system 38. Preferably, tempering fluid TF is injected from openings 37A generally perpendicular to the flow of polluted combustion gas PG through the tempering compartment 28.

The plurality of flow vanes 36A, 36B are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto.

The tempering compartment 28 is supplied tempering fluid TF, such as ambient air, chilled air or the like from a tempering fluid supply 40 via fluidly connected duct 40A fluidly connected to pipes 34, 35 of first pipe arrangement 32A and second pipe arrangement 32B. Tempering fluid supply 40 may be a fan or pump supplying ambient air as a tempering fluid TF. Alternatively, tempering fluid supply 40 may be a heat exchanger or cooling system that generates cooled or chilled air supplied as a tempering fluid TF. Within the tempering compartment 28, supplied tempering fluid TF flows through pipes 34, 35 and injected into the interior area 29 from the one or more openings 37A along sides 37B of pipes 34, 35. Preferably, within the first pipe arrangement 32A and the second pipe arrangement 32B, openings 37A alternate sides 37B of pipes 34, 35 so that openings 37A are arranged on opposite sides 37B of adjacent pipes 34, 35. By openings 37A alternating sides 37B of adjacently arranged pipes 34, 35, adjacent openings 37A are arranged "facing" or "opposing" one another. Also, facing or opposing openings 37A may be the same or differ, inject in a single direction or multiple directions, and/or aligned or offset one from another. Abutting or affixed to sides 37B of adjacent pipes 34, 35 opposite openings 37A are flow vanes 36A, 36B. Likewise, a flow vane 36A, 36B abuts or is affixed between sides 37B of end pipes 33 and tempering air compartment 28 opposed side walls 28A.

Polluted combustion gas PG having a pollutant content NC flows from duct 12A through inlet 42 in inlet wall 28B into interior area 29 of tempering compartment 28 of tempering system 26. Polluted combustion gas PG entering tempering compartment 28 through inlet 42 is relatively hot having a temperature ranging to about 650° C. Flow of this relatively hot polluted combustion gas PG through the tempering compartment 28 is diverted by flow vanes 36A causing the relatively hot polluted combustion gas PG to flow between adjacent parallel pipes 34 of the first pipe arrangement 32A of the arrangement pair 30. Openings 37A of pipes 34 supply tempering fluid TF to the tempering compartment 28 and hence to the relatively hot polluted combustion gas PG flowing between the pipes 34. The tempering fluid TF supplied to the tempering compartment 28 via openings 37A cools the relatively hot polluted combustion gas PG and mixes further with the polluted combustion gas PG in the relatively turbulent mix area 32C to produce a polluted mixed gas MG having a reduced temperature, in some systems 10 ranging from about 500° C. to about 600° C. Flow of the polluted mixed gas MG through the tempering compartment 28 downstream the first pipe arrangement 32A of the arrangement pair 30, is again diverted by flow vanes 36B causing the polluted mixed gas MG to flow between adjacent pipes 35 of the second pipe arrangement 32B. Openings 37A of the pipes 35 supply tempering fluid TF to the tempering compartment 28 and hence to the polluted mixed gas MG flowing between the adjacent, parallel pipes 35. The tempering fluid TF supplied to the tempering compartment 28 via openings 37A in pipes 35 cools the polluted mixed gas MG and mixes with the polluted mixed gas MG to produce a cooler mixed gas CM having a temperature ranging from about 350° C. to about 500° C. The cooler mixed gas CM downstream of the second pipe arrangement 32B, is of a relatively uniform temperature profile across a cross-section S-S of the tempering compartment 28 parallel to outlet wall 28C and perpendicular with respect to the general flow of polluted combustion gas PC/polluted mixed gas MG/cooler mixed gas CM through the tempering compartment 28 from inlet 42 to outlet 44. Achieving the cooler mixed gas CM of relatively uniform temperature profile is facilitated by the pipes 34, 35 and plurality of flow vanes 36A, 36B arranged spaced a distance W apart to allow for fluid mixing in the relatively turbulent mix area 32C therebetween. With the plurality of flow vanes 36A, 36B arranged along each side 37B of each pipe 34, 35 opposite openings 37A and along opposed side walls 28A, the polluted combustion gas PC/polluted mixed gas MG flow is diverted thereby generating a thorough mixing and forcing polluted combustion gas PC/polluted mixed gas MG flow relatively exclusively between pipes 34, 35 past openings 37A with tempering fluid TF flowing therefrom. The resultant cooler mixed gas CM of relatively uniform temperature profile flows from outlet 44 of tempering compartment 28 via fluidly connected duct 26A into inlet 46 of associated selective catalyst reduction system 38.

In accordance with the subject disclosure, the selective catalyst reduction system 38 comprises one or more catalyst beds 48A equipped with a catalyst 48 arranged within an interior area 50 defined by a housing 52 having an inlet 46 and an outlet 64. Cooler mixed gas CM flowing into inlet 46 of the selective catalyst reduction system 38 housing 52 contacts surface 54 of catalyst 48. The catalyst 48 may be of a conventional commercially available material, such as vanadium oxide ($V_2O_5$) and/or titanium dioxide ($TiO_2$). The catalyst 48 may exist as a homogeneous structure entirely of catalyst material, or as a heterogenous catalytic coating supported on a mechanically strong but catalytically inert structure or support 49. The catalyst 48 may be of any suitable size, shape, or configuration. Further, an injection system 56 may be positioned upstream of the catalyst 48, such as for example, within duct 26A adjacent inlet 46. Injection system 56 comprises piping 58 equipped with nozzles 60 and a static mixer 70. Fluidly connected to piping 58 is a reductant supply 62. Reductant supply 62 supplies a reducing agent RA such as for example ammonia and/or urea to piping 58 via pipe 62A. From piping 58, reducing agent RA is injected by nozzles 60 into the cooler mixed gas CM. Downstream with respect to the flow of the cooler mixed gas CM of the nozzles 60 is the static mixer 70. Static mixer 70 is configured for mixing the reducing agent RA with the cooler mixed gas CM for an even distribution of the reducing agent RA throughout the cooler mixed gas CM prior to the cooler mixed gas CM entering into inlet 46 of the selective catalyst reduction system 38 housing 52. The catalyst 48 selectively adsorbs nitrogen oxides and the supplied reducing agent RA from the cooler mixed gas CM, thereby producing treated gas TG of a reduced pollutant content NC, e.g., reduced nitrogen oxides, as compared to that of the cooler mixed gas CM. The adsorbed nitrogen oxides and reducing agent RA undergo a chemical reaction on surface 54 of catalyst 48 with the produced reaction products desorbed. More specifically, the reducing agent RA reacts with the nitrogen oxides in the cooler mixed gas CM to form water and nitrogen. The produced treated gas TG flows out of housing 52 via outlet 64 for further treatment or for environmentally conservative release to the atmosphere.

Figure 8:
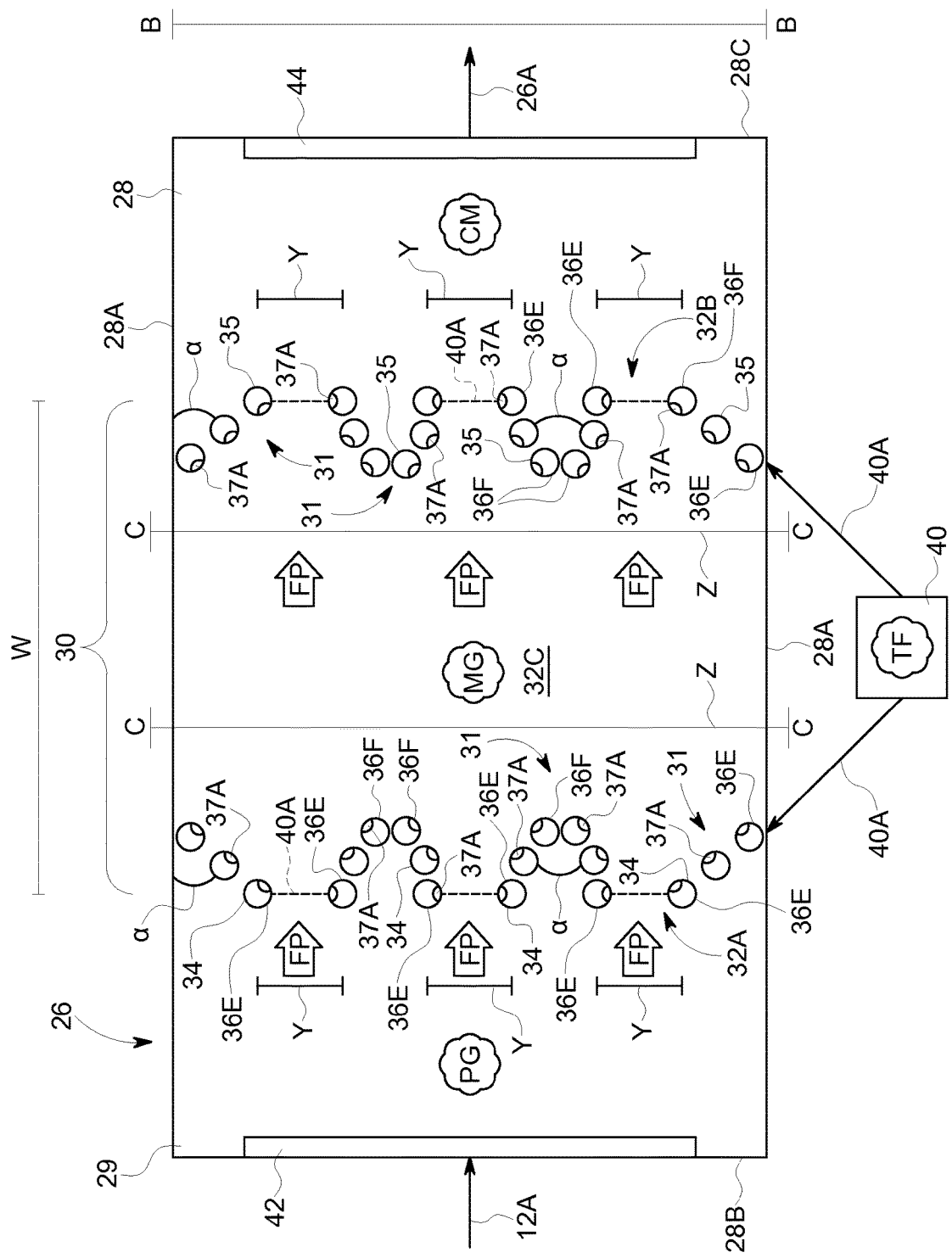
FIG. 8 is a schematic top cross sectional view of a third embodiment of the tempering system of FIG. 1.
Figure 9:
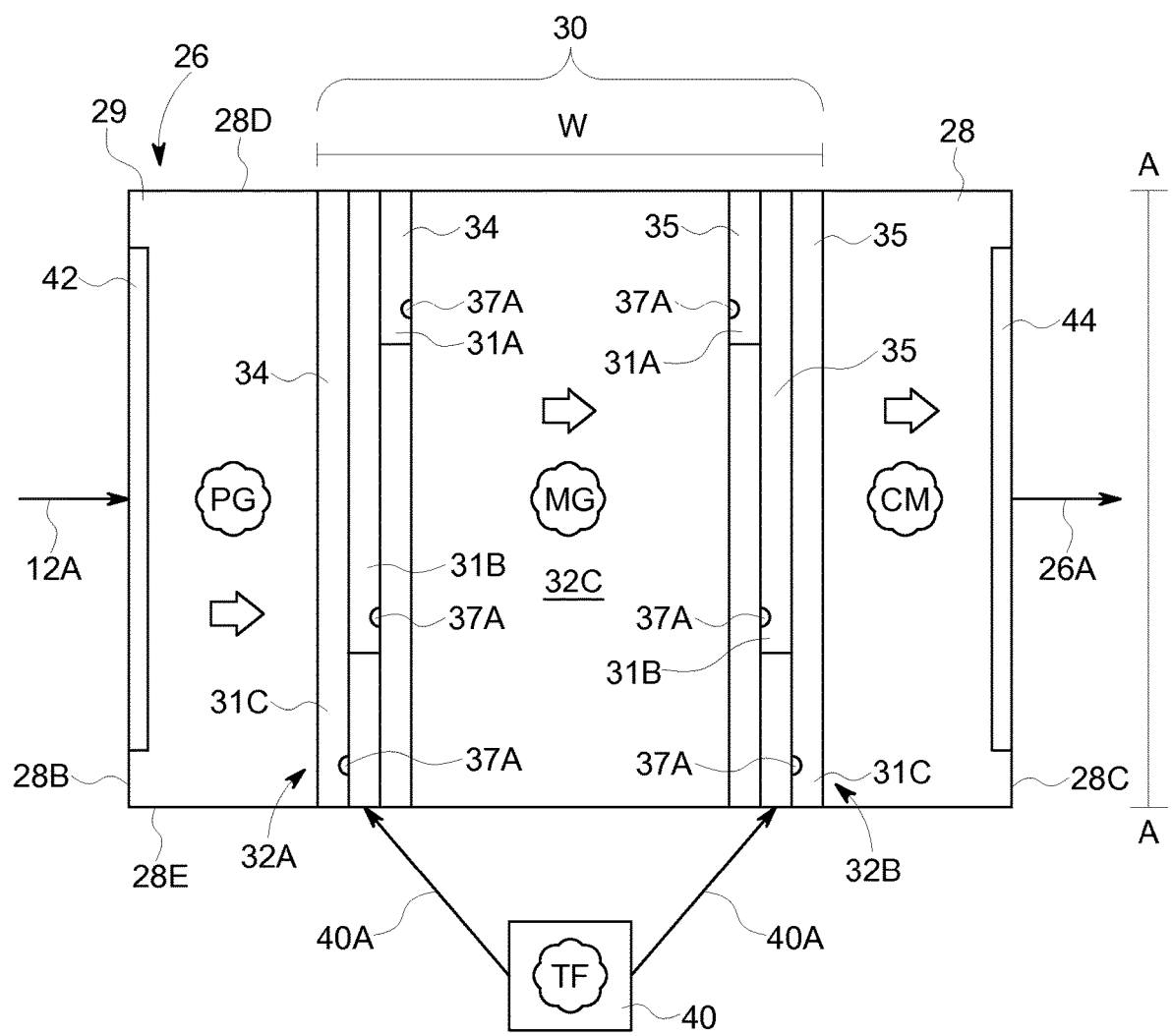
FIG. 9 is a schematic side cross sectional view of the third embodiment of the tempering system of FIG. 8.
Figure 10:
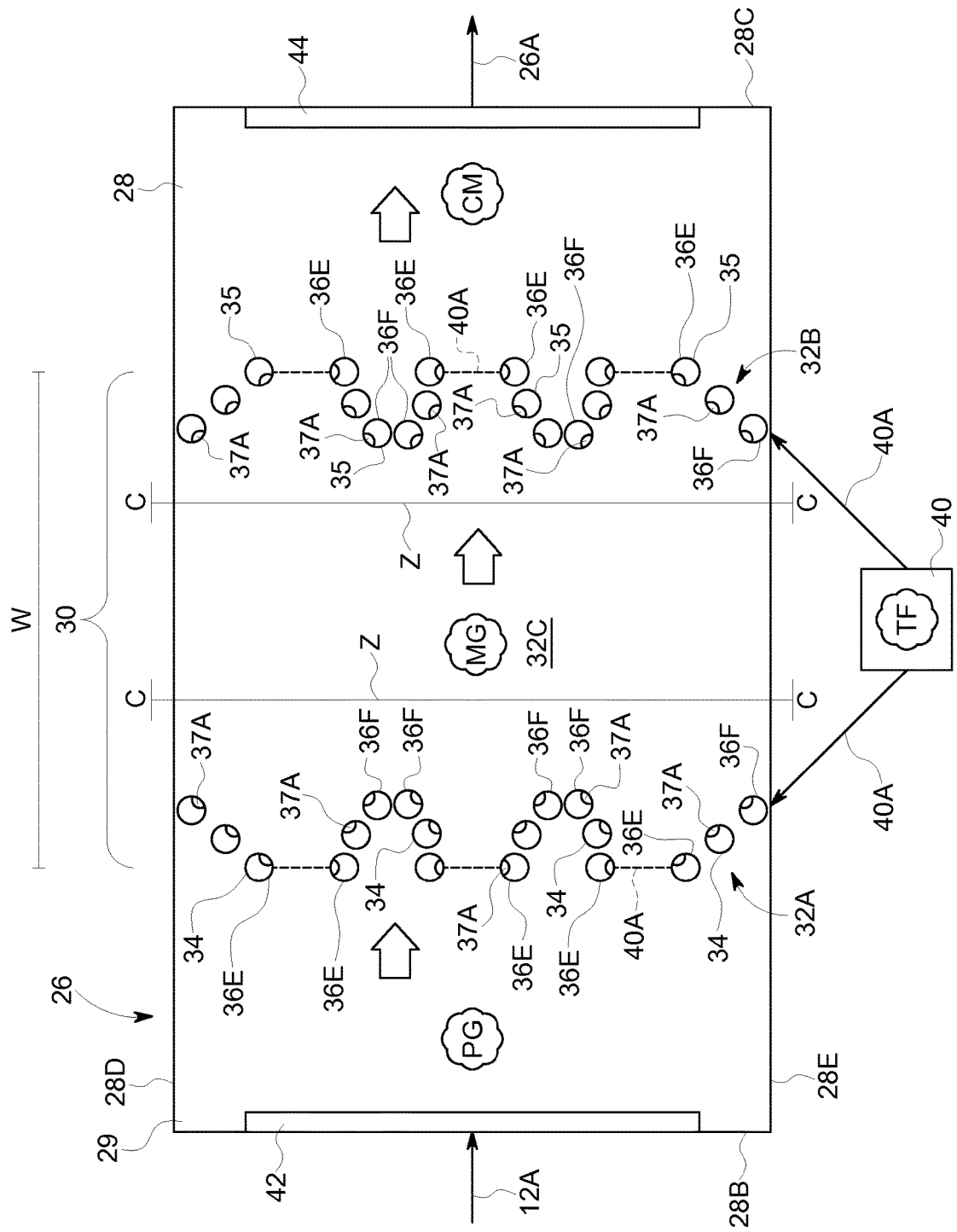
FIG. 10 is a schematic side cross sectional view of a variation of the third embodiment of the tempering system of FIG. 8.

A third embodiment of the subject tempering system 26, as illustrated in FIGS. 8 through 10, comprises a tempering compartment 28 comprising opposed side walls 28A unitarily formed with or attached between inlet wall 28B, outlet wall 28C, top 28D and bottom 28E, together defining an interior area 29. Interior area 29 is equipped with at least one arrangement pair 30 comprising a first pipe arrangement 32A and a second pipe arrangement 32B spaced a distance W apart to allow for fluid mixing in a relatively turbulent mix area 32C therebetween. The first pipe arrangement 32A comprises a first plurality of pipes 34 with one or more openings 37A and the second pipe arrangement 32B comprises a second plurality of pipes 35 with one or more openings 37A. The first plurality of pipes 34 and the second plurality of pipes 35 each comprise relatively high temperature environment self-supporting pipes 34, 35 of circular, square, triangular or other geometry, although circular is illustrated. According to the embodiment illustrated in FIGS. 8 through 10, the first pipe arrangement 32A comprises groupings 31 of pipes 34 arranged generally in side 37B by side 37B contact, or alternatively spaced relatively slightly apart. Between the groupings 31 of pipes 34 is a distance Y defining a flow passage FP for polluted combustion gas PC flow therebetween. The second pipe arrangement 32B comprises groupings 31 of pipes 35 arranged generally in side 37B by side 37B contact, or alternatively spaced relatively slightly apart. Between the groupings 31 of pipes 35 is a distance Y defining a flow passage FP for polluted mixed gas MG flow therebetween. Each the first plurality of pipes 34, and the second plurality of pipes 35, are arranged in groupings 31 to block about 10 percent to about 70 percent of areas Z of cross sections C of the interior area 29 in which arranged. Groupings 31 of each the first plurality of pipes 34, and the second plurality of pipes may be arranged generally in the shape of the letter "V", forming an angle α of about 5 degrees to about 90 degrees with respect to the general flow of polluted combustion gas PG through interior area 29. As such, end pipes 36E of groupings 31 of the first plurality of pipes 34 are upstream of center pipes 36F. Conversely, end pipes 36E of groupings 31 of the second plurality of pipes 35 are downstream of center pipes 36F. Hence, according to the subject disclosure, the first pipe arrangement 32A and the second pipe arrangement 32B within an arrangement pair 30 may be the same or differ depending on tempering fluid TF requirements for optimal operation of the selective catalyst reduction system 38. Likewise, arrangement pairs 30 within the tempering compartment 28 may be the same or differ depending on tempering fluid TF requirements for optimal operation of the selective catalyst reduction system 38. Further, groupings 31 of the first plurality of pipes 34 and groupings 31 of the second plurality of pipes 35 are aligned meaning groupings 31 of the second plurality of pipes 35 are downstream and directly behind groupings 31 of the first plurality of pipes 34. The pipes 34, 35 may be configured for a flow of tempering fluid TF from openings 37A along an entire length of the elongated pipe 34, 35, or configured for a flow of tempering fluid TF only to one or more openings 37A in a first end region 31A of a pipe 34, 35, only to one or more openings 37A in a middle region 31B of a pipe 34, 35, or only to one or more openings 37A in a second end region 31C of a pipe 34, 35. As such, openings 37A are arranged on sides 37B of pipes 34 for downstream, with respect to polluted combustion gas PC/polluted mixed gas MG flow through the tempering compartment 28, injection of tempering fluid TF. Conversely, openings 37A are arranged on sides 37B of pipes 35 for upstream, with respect to polluted combustion gas PC/polluted mixed gas MG flow through the tempering compartment 28, injection of tempering fluid TF. According to the embodiment of FIGS. 8 and 9, each the first plurality of pipes 34 and the second plurality of pipes 35 are arranged with a longitudinal axis A-A extending vertically, i.e., from bottom 28E to top 28D of tempering compartment 28, and hence generally perpendicular with respect to the flow of polluted combustion gas PG through the tempering compartment 28. According to a variation of this embodiment illustrated in FIG. 10, each the first plurality of pipes 34 and the second plurality of pipes 35, are arranged with a longitudinal axis B-B extending horizontally, i.e., from opposed side walls 28A of tempering compartment 28, and hence generally perpendicular with respect to the flow of polluted combustion gas PG through the tempering compartment 28. According to the subject disclosure, the subject tempering compartment 28 may be equipped with one to twenty or more arrangement pairs 30 depending upon operational requirements of an associated downstream, with respect to the flow of polluted combustion gas PG through the gas turbine engine system 10, selective catalyst reduction system 38. However, only one arrangement pair 30 is illustrated in FIGS. 8 through 10 for purposes of simplicity and clarity, not limitation.

The plurality of relatively high temperature environment self-supporting pipes 34, 35 are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto. Pipes 34, 35 may be varied in size based on the tempering fluid TF requirements for optimal operation of the selective catalyst reduction system 38. Openings 37A in pipes 34, 35 may be sized and shaped, such as circular, square, triangular, or any other geometry, for achieving tempering fluid TF requirements for optimal operation of the selective catalyst reduction system 38. Likewise, each of openings 37A may be the same or differ, operable to inject tempering fluid TF in a single direction or in multiple directions within interior area 29 depending on tempering fluid TF requirements for optimal operation of the selective catalyst reduction system 38.

The tempering compartment 28 is supplied tempering fluid TF, such as ambient air, chilled air or the like from a tempering fluid supply 40 via fluidly connected duct 40A fluidly connected to pipes 34, 35 of first pipe arrangement 32A and second pipe arrangement 32B. Tempering fluid supply 40 may be a fan or pump supplying ambient air as a tempering fluid TF. Alternatively, tempering fluid supply 40 may be a heat exchanger or cooling system that generates cooled or chilled air supplied as a tempering fluid TF. Within the tempering compartment 28, supplied tempering fluid TF flows through pipes 34, 35 and injected into the interior area 29 from the one or more openings 37A along sides 37B of pipes 34, 35. Preferably, within the first pipe arrangement 32A and the second pipe arrangement 32B, openings 37A alternate sides 37B so that openings 37A are arranged on opposite sides 37B of pipes 34, 35 for downstream injection by pipes 34 and upstream injection by pipes 35. Also, openings 37A may be the same or differ, inject in a single direction or multiple directions, aligned or offset one from another, and/or arranged for injection from an entire length, the first end region 31A, middle region 31B, and/or second end region 31C of the pipes 34, 35.

Polluted combustion gas PG having a pollutant content NC flows from duct 12A through inlet 42 in inlet wall 28B into interior area 29 of tempering compartment 28 of tempering system 26. Polluted combustion gas PG entering tempering compartment 28 through inlet 42 is relatively hot having a temperature ranging to about 650° C. Flow of this relatively hot polluted combustion gas PG through the tempering compartment 28 is diverted by groupings 31 of pipes 34 causing the relatively hot polluted combustion gas PG to flow in the flow passage FP between the groupings 31 of pipes 34 of the first pipe arrangement 32A of the arrangement pair 30. Openings 37A of pipes 34 supply tempering fluid TF to the tempering compartment 28 and hence to the relatively hot polluted combustion gas PG flowing in the flow passage FP between the pipes 34. The tempering fluid TF supplied to the tempering compartment 28 via openings 37A cools the relatively hot polluted combustion gas PG and mixes further with the polluted combustion gas PG in the relatively turbulent mix area 32C to produce a polluted mixed gas MG having a reduced temperature, in some systems 10 ranging from about 500° C. to about 600° C. Flow of the polluted mixed gas MG through the tempering compartment 28 downstream the first pipe arrangement 32A of the arrangement pair 30, is again diverted by groupings 31 of pipes 35 causing the relatively hot polluted combustion gas PG to flow in the flow passage FP between the groupings 31 of pipes 35 of the second pipe arrangement 32B of the arrangement pair 30. Openings 37A of the pipes 35 supply tempering fluid TF to the tempering compartment 28 and hence to the polluted mixed gas MG flowing in the flow passage FP between the pipes 35. The tempering fluid TF supplied to the tempering compartment 28 via openings 37A in pipes 35 cools the polluted mixed gas MG and mixes with the polluted mixed gas MG to produce a cooler mixed gas CM having a temperature ranging from about 350° C. to about 500° C. The cooler mixed gas CM downstream of the second pipe arrangement 32B, is of a relatively uniform temperature profile across a cross-section S-S of the tempering compartment 28 parallel to outlet wall 28C and perpendicular with respect to the general flow of polluted combustion gas PC/polluted mixed gas MG/cooler mixed gas CM through the tempering compartment 28 from inlet 42 to outlet 44. Achieving the cooler mixed gas CM of relatively uniform temperature profile is facilitated by the first pipe arrangement 32A and the second pipe arrangement 32B arranged spaced the distance W apart to allow for fluid mixing in the relatively turbulent mix area 32C therebetween. With the first pipe arrangement 32A and the second pipe arrangement 32B arranged in pipe 34, 35 groupings 31, the polluted combustion gas PC/polluted mixed gas MG flow is diverted thereby generating a thorough mixing and forcing polluted combustion gas PC/polluted mixed gas MG flow relatively exclusively in the flow passage FP between the pipes 34, 35 past openings 37A with tempering fluid TF flowing therefrom. The resultant cooler mixed gas CM of relatively uniform temperature profile flows from outlet 44 of tempering compartment 28 via fluidly connected duct 26A into inlet 46 of associated selective catalyst reduction system 38.

In accordance with the subject disclosure, the selective catalyst reduction system 38 comprises one or more catalyst beds 48A equipped with a catalyst 48 arranged within an interior area 50 defined by a housing 52 having an inlet 46 and an outlet 64. Cooler mixed gas CM flowing into inlet 46 of the selective catalyst reduction system 38 housing 52 contacts surface 54 of catalyst 48. The catalyst 48 may be of a conventional commercially available material, such as vanadium oxide ($V_2O_5$) and/or titanium dioxide ($TiO_2$). The catalyst 48 may exist as a homogeneous structure entirely of catalyst material, or as a heterogenous catalytic coating supported on a mechanically strong but catalytically inert structure or support 49. The catalyst 48 may be of any suitable size, shape, or configuration. Further, an injection system 56 may be positioned upstream of the catalyst 48, such as for example, within duct 26A adjacent inlet 46. Injection system 56 comprises piping 58 equipped with nozzles 60 and a static mixer 70. Fluidly connected to piping 58 is a reductant supply 62. Reductant supply 62 supplies a reducing agent RA such as for example ammonia and/or urea to piping 58 via pipe 62A. From piping 58, reducing agent RA is injected by nozzles 60 into the cooler mixed gas CM. Downstream with respect to the flow of the cooler mixed gas CM of the nozzles 60 is the static mixer 70. Static mixer 70 is configured for mixing of the reducing agent RA and cooler mixed gas CM for an even distribution of the reducing agent RA throughout the cooler mixed gas CM prior to the cooler mixed gas CM entering into inlet 46 of the selective catalyst reduction system 38 housing 52. The catalyst 48 selectively adsorbs nitrogen oxides and the supplied reducing agent RA from the cooler mixed gas CM, thereby producing treated gas TG of a reduced pollutant content NC, e.g., reduced nitrogen oxides, as compared to that of the cooler mixed gas CM. The adsorbed nitrogen oxides and reducing agent RA undergo a chemical reaction on surface 54 of catalyst 48 with the produced reaction products desorbed. More specifically, the reducing agent RA reacts with the nitrogen oxides in the cooler mixed gas CM to form water and nitrogen. The produced treated gas TG flows out of housing 52 via outlet 64 for further treatment or for environmentally conservative release to the atmosphere.

A method of using a gas turbine engine system 10 according to the subject disclosure comprises arranging a tempering system 26 and a selective catalytic reduction system 38, each with fluid connection to a gas turbine engine 12, and adsorbing gas turbine engine 12 combustor 18 generated polluted combustion gas PG pollutants to obtain a treated gas TG of a reduced pollutant content, e.g., reduced nitrogen oxides and/or carbon oxides content. According to such method, the gas turbine engine 12 of the subject gas turbine engine system 10 comprises a compressor 14, gas supply 16, combustor 18, fuel supply 20, shaft 22, and external load 24. The compressor 14 of the gas turbine engine 12 compresses a gas G, such as for example air, supplied to the compressor 14 from the gas supply 16 via fluidly connected duct 16A, thereby generating compressed gas CG. The compressed gas CG flows from compressor 14 to the combustor 18 via fluidly connected duct 14A. Within the combustor 18, the supplied compressed gas CG is mixed with a pressurized flow of fuel F supplied to the combustor 18 from fuel supply 20 via fluidly connected duct 20A. Fuel F may be natural gas, various types of syngas, liquid fuels, other fuels and/or blends thereof. Igniting the mixed compressed gas CG and fuel F within the combustor 18 generates via combustion a polluted combustion gas PG. The generated polluted combustion gas PG comprises nitrogen oxides ($NO_x$), carbon oxides ($CO_x$), and like regulated pollutants. From the combustor 18, the polluted combustion gas PG is supplied to the gas turbine engine 12 via duct 18A. The supplied polluted combustion gas PG drives the gas turbine engine 12 to produce mechanical work MW. The mechanical work MW of gas turbine engine 12 drives the compressor 14 via a shaft 22, as well as driving an external load 24. External load 24 may be an electrical generator or the like equipment.

Fluidly connected to gas turbine engine 12 via duct 12A is a tempering system 26. Tempering system 26 comprises a tempering compartment 28 comprising opposed side walls 28A unitarily formed with or attached between inlet wall 28B, outlet wall 28C, top 28D and bottom 28E, together defining an interior area 29. Interior area 29 is equipped with at least one arrangement pair 30. Each of the at least one arrangement pair 30 comprises a first pipe arrangement 32A and a second pipe arrangement 32B spaced a distance W apart to allow for fluid mixing in a relatively turbulent mix area 32C therebetween. The first pipe arrangement 32A comprises a first plurality of pipes 34 with one or more openings 37A and the second pipe arrangement 32B comprises a second plurality of pipes 35 with one or more openings 37A. According to the subject disclosure, the subject tempering compartment 28 may be equipped with one to twenty or more arrangement pairs 30 depending upon operational requirements of an associated downstream, with respect to the flow of polluted combustion gas PG through the gas turbine engine system 10, selective catalyst reduction system 38. However, only one arrangement pair 30 is illustrated in FIGS. 1 through 10 for purposes of simplicity and clarity, not limitation.

The plurality of relatively high temperature environment self-supporting pipes 34, 35 are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto. Pipes 34, 35 may be varied in size based on the tempering fluid TF requirements for optimal operation of the selective catalyst reduction system 38. Openings 37A in pipes 34, 35 may be sized and shaped, such as circular, square, triangular, or any other geometry, for achieving tempering fluid TF requirements for optimal operation of the selective catalyst reduction system 38. Likewise, each of openings 37A may be the same or differ, operable to inject tempering fluid TF in a single direction or in multiple directions within interior area 29 depending on tempering fluid TF requirements for optimal operation of the selective catalyst reduction system 38.

The plurality of flow vanes 36A, 36B are preferably fabricated from materials stable within an environment reaching temperatures as high as about 1000° C. Examples of such materials include Alloy Heat Resistant Stainless Steel 321H SS commercially available from Sandmeyer Steel Company, Philadelphia, Pa., USA, and available metal products similar thereto.

The tempering compartment 28 is supplied tempering fluid TF, such as air, from a tempering fluid supply 40 via fluidly connected duct 40A fluidly connected to pipes 34, 35 of first pipe arrangement 32A and a second pipe arrangement 32B. Tempering fluid supply 40 may be a fan or pump supplying ambient air as a tempering fluid TF. Alternatively, tempering fluid supply 40 may be a cooling system that generates cooled air supplied as a tempering fluid TF. Within the tempering compartment 28, supplied tempering fluid TF flows through pipes 34, 35 and out openings 37A along sides 37B of pipes 34, 35.

Polluted combustion gas PG having a pollutant content NC flows from duct 12A through inlet 42 in inlet wall 28B into interior area 29 of tempering compartment 28 of tempering system 26. Polluted combustion gas PG entering tempering compartment 28 through inlet 42 is relatively hot having a temperature ranging to about 650° C. Flow of this relatively hot polluted combustion gas PG through the tempering compartment 28 is diverted by pipes 34 and optionally flow vanes 36A causing the relatively hot polluted combustion gas PG to flow between pipes 34 of the first pipe arrangement 32A. Openings 37A of the pipes 34 supply tempering fluid TF to the tempering compartment 28 and hence to the relatively hot polluted combustion gas PG flowing between pipes 34. The tempering fluid TF supplied to the tempering compartment 28 via openings 37A cools the relatively hot polluted combustion gas PG and mixes with the polluted combustion gas PG to produce a polluted mixed gas MG having a reduced temperature, in some systems 10 ranging from about 500° C. to about 600° C. Flow of the polluted mixed gas MG through the tempering compartment 28 downstream of the first pipe arrangement 32A, is again diverted by pipes 35 and optionally flow vanes 36B causing the polluted mixed gas MG to flow between pipes 35 of the of the second pipe arrangement 32B. Openings 37A in pipes 35 supply tempering fluid TF to the tempering compartment 28 and hence to the polluted mixed gas MG flowing between the pipes 35. The tempering fluid TF supplied to the tempering compartment 28 via openings 37A cools the polluted mixed gas MG and mixes with the polluted mixed gas MG to produce a cooler mixed gas CM having a temperature ranging from about 350° C. to about 500° C. The cooler mixed gas CM downstream of the second pipe arrangement 32B, is of a relatively uniform temperature profile across a cross-section S-S of the tempering compartment 28 parallel to outlet wall 28C and perpendicular with respect to the general flow of polluted combustion gas PC/polluted mixed gas MG/cooler mixed gas CM through the tempering compartment 28 from inlet 42 to outlet 44. Achieving the cooler mixed gas CM of relatively uniform temperature profile is facilitated by pipes 34, 35, the first plurality of flow vanes 36A and second plurality of flow vanes 36B, or by the groupings 31 of pipes 34, 35 arranged within tempering compartment 28. With the pipes 34, 35, first plurality of flow vanes 36A and second plurality of flow vanes 36B, or by the groupings 31 of pipes 34, 35 arranged within tempering compartment 28, the polluted combustion gas PC/polluted mixed gas MG flow is diverted thereby generating a thorough mixing and forcing polluted combustion gas PC/polluted mixed gas MG flow past openings 37A with tempering fluid TF flowing therefrom. The resultant cooler mixed gas CM of relatively uniform temperature profile flows from outlet 44 of tempering compartment 28 via fluidly connected duct 26A into inlet 46 of associated selective catalyst reduction system 38.

In accordance with the subject disclosure, the selective catalyst reduction system 38 comprises one or more catalyst beds 48A equipped with a catalyst 48 arranged within an interior area 50 defined by a housing 52 having an inlet 46 and an outlet 64. Cooler mixed gas CM flowing into inlet 46 of the selective catalyst reduction system 38 housing 52 contacts surface 54 of catalyst 48. The catalyst 48 may be of a conventional commercially available material, such as vanadium oxide ($V_2O_5$) and/or titanium dioxide ($TiO_2$). The catalyst 48 may exist as a homogeneous structure entirely of catalyst material, or as a heterogenous catalytic coating supported on a mechanically strong but catalytically inert structure or support 49. The catalyst 48 may be of any suitable size, shape, or configuration. Further, an injection system 56 may be positioned upstream of the catalyst 48, such as for example, within duct 26A adjacent inlet 46. Injection system 56 comprises piping 58 equipped with nozzles 60 and a static mixer 70. Fluidly connected to piping 58 is a reductant supply 62. Reductant supply 62 supplies a reducing agent RA such as for example ammonia and/or urea to piping 58. From piping 58, reducing agent RA is injected by nozzles 60 into the cooler mixed gas CM. The catalyst 48 selectively adsorbs nitrogen oxides and the supplied reducing agent RA from the cooler mixed gas CM, thereby producing treated gas TG of a reduced pollutant content, e.g., reduced nitrogen oxides, as compared to that of the cooler mixed gas CM. The adsorbed nitrogen oxides and reducing agent RA undergo a chemical reaction on surface 54 of catalyst 48 with the produced reaction products desorbed. More specifically, the reducing agent RA reacts with the nitrogen oxides in the cooler mixed gas CM to form water and nitrogen. The produced treated gas TG flows out of housing 52 via outlet 64 for further treatment or for environmentally conservative release to the atmosphere.

In summary, the subject gas turbine engine system 10 comprises a gas turbine engine 12, a tempering system 26 comprising a tempering compartment 28 comprising an inlet 42, an outlet 44, at least one arrangement pair 30 comprising a first pipe arrangement 32A and a second pipe arrangement 32B spaced a distance W apart, a mix area 32C in the distance W between the first pipe arrangement 32A and the second pipe arrangement 32B, with the first pipe arrangement 32A comprising a first plurality of pipes 34, with the second pipe arrangement 32B comprising a second plurality of pipes 35, and one or more openings 37A in each pipe 34, 35 of the first plurality of pipes 34 and the second plurality of pipes 35, and a selective catalytic reduction system 38. The subject gas turbine engine system 10 further comprises flow vanes 36A arranged within the first pipe arrangement 32A, and a tempering fluid supply 40 operable to supply a tempering fluid TF to the tempering compartment 28 via the plurality of openings 37A. In an embodiment of the subject gas turbine engine system 10, the first pipe arrangement 32A is arranged horizontally extending between opposed side walls 28A of the tempering compartment 28. In an embodiment of the subject gas turbine engine system 10, the first pipe arrangement 32A is arranged vertically extending from a bottom 28E to a top 28D of the tempering compartment 28. According to the subject gas turbine engine system 10, one or more openings 37A supply a tempering fluid TF to the tempering compartment 28 in a plurality of directions. In an embodiment of the subject system 10, flow vanes 36A, 36B are arranged within the first pipe arrangement 32A and arranged within the second pipe arrangement 32B. Also, according to an embodiment of the subject system 10, the one or more openings 37A are arranged along an entire length of the pipes 34, 35, in a first end region 31A of the pipes 34, 35, in a middle region 31B of the pipes 34, 35, in a second end region 31C of the pipes 34, 35, or a combination thereof.

In summary, a method of using a gas turbine engine system 10 comprises supplying a polluted combustion gas PG comprising a pollutant content NC generated by a gas turbine engine 12 to a downstream tempering system 26, the tempering system 26 comprises a tempering compartment 28 comprising an inlet 42, an outlet 44, at least one arrangement pair 30 comprising a first pipe arrangement 32A and a second pipe arrangement 32B spaced a distance W apart, a mix area 32C in the distance W between the first pipe arrangement 32A and the second pipe arrangement 32B, with the first pipe arrangement 32A comprising a first plurality of pipes 34, with the second pipe arrangement 32B comprising a second plurality of pipes 35, and one or more openings 37A in each pipe 34, 35 of the first plurality of pipes 34 and the second plurality of pipes 35, supplying a tempering fluid TF to the polluted combustion gas PG within the tempering compartment 28 via the one or more openings 37A to obtain a reduced temperature mixed gas MG, and supplying the reduced temperature mixed gas CM to a downstream selective catalytic reduction system 38 to obtain a treated gas TG of a reduced pollutant content NC as compared to that of the polluted combustion gas PG. Also, according to the subject method, flow vanes 36A are arranged within the first pipe arrangement 32A, or flow vanes 36A, 36B are arranged within both the first pipe arrangement 32A and the second pipe arrangement 32B. The tempering fluid TF according to the subject method is air or cooled air. Also, according to the subject method, the first pipe arrangement 32A is arranged horizontally to extend between opposed side walls 28A of the tempering compartment 28, or the first pipe arrangement 32A is arranged vertically to extend from a bottom 28E to a top 28D of the tempering compartment 28. Further according to the subject method, the one or more openings 37A supply the tempering fluid TF to the tempering compartment 28 in a plurality of directions. The one or more openings 37A are arranged along an entire length of the pipes 34, 35, in a first end region 31A of the pipes 34, 35, in a middle region 31B of the pipes 34, 35, in a second end region 31C of the pipes 34, 35, or in a combination thereof.

While the subject disclosure has been described with reference to a number of embodiments, those skilled in the art will understand that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, the subject disclosure is not intended to be limited to the particular embodiments disclosed for the subject systems and methods, but that the subject disclosure will include all embodiments falling within the scope of the appended claims. Moreover, the use of the terms "first", "second", etc., do not denote any order or importance, but rather are used to distinguish one element from another. Further, use of the terms "downstream" and "upstream" are relative, with regard to an overall general direction of flue gas FG flow through gas turbine engine system 10.

The invention claimed is:

1. A gas turbine engine system, comprising:
a gas turbine engine;
a tempering system comprising a tempering compartment to receive a flow of polluted combustion gas from the gas turbine engine, the tempering compartment comprising an inlet, an outlet, at least one arrangement pair comprising a first pipe arrangement and a second pipe arrangement spaced a distance apart, a mix area in the distance between the first pipe arrangement and the second pipe arrangement, with the first pipe arrangement comprising a first plurality of pipes, with the second pipe arrangement comprising a second plurality of pipes, one or more openings in each pipe of the first plurality of pipes and the second plurality of pipes, and a plurality of flow vanes arranged within the first pipe arrangement and the second pipe arrangement; and
a selective catalytic reduction system downstream of the tempering system.

2. The system of claim 1, wherein the plurality of flow vanes arranged within the first pipe arrangement and the second pipe arrangement are disposed within the tempering compartment in the flow of the polluted combustion gas.

3. The system of claim 1, further comprising a tempering fluid supply operable to supply a tempering fluid to the tempering compartment via the plurality of openings.

4. The system of claim 1, wherein the first pipe arrangement is arranged horizontally extending between opposed side walls of the tempering compartment.

5. The system of claim 1, wherein the first pipe arrangement is arranged vertically extending from a bottom to a top of the tempering compartment.

6. The system of claim 1, wherein the one or more openings supply a tempering fluid to the tempering compartment in a plurality of directions.

7. The system of claim 1, wherein the one or more openings are arranged along an entire length of the pipes, in a first end region of the pipes, in a middle region of the pipes, in a second end region of the pipes, or a combination thereof.

8. A method of using a gas turbine engine system comprising:
supplying a polluted combustion gas comprising a pollutant content generated by a gas turbine engine to a downstream tempering system, the tempering system comprising a tempering compartment comprising an inlet, an outlet, at least one arrangement pair comprising a first pipe arrangement and a second pipe arrangement spaced a distance apart, a mix area in the distance between the first pipe arrangement and the second pipe arrangement, with the first pipe arrangement comprising a first plurality of pipes, with the second pipe arrangement comprising a second plurality of pipes, one or more openings in each pipe of the first plurality of pipes and the second plurality of pipes, and a plurality of flow vanes arranged within the first pipe arrangement and the second pipe arrangement;
supplying a tempering fluid to the polluted combustion gas within the tempering compartment via the one or more openings to obtain a reduced temperature mixed gas; and
supplying the reduced temperature mixed gas to a downstream selective catalytic reduction system to obtain a treated gas of a reduced pollutant content as compared to that of the polluted combustion gas.

9. The method of claim 8, wherein the plurality of flow vanes arranged within the first pipe arrangement and the second pipe arrangement are disposed within the tempering compartment in a flow path of the polluted combustion gas.

10. The method of claim 8, wherein the tempering fluid is air or cooled air.

11. The method of claim 8, wherein the first pipe arrangement is arranged horizontally extending between opposed side walls of the tempering compartment.

12. The method of claim 8, wherein the first pipe arrangement is arranged vertically extending from a bottom to a top of the tempering compartment.

13. The method of claim 8, wherein the one or more openings supply the tempering fluid to the tempering compartment in a plurality of directions.

14. The method of claim 8, wherein the one or more openings are arranged along an entire length of the pipes, in a first end region of the pipes, in a middle region of the pipes, in a second end region of the pipes, or a combination thereof.

15. The system of claim 1, wherein each vane of the plurality of flow vanes forms a V shape about a respective one of the one or more openings in the plurality of pipes of the first pipe arrangement and the second pipe arrangement.

16. The system of claim 15, wherein the V shape forms an angle $\alpha$ to the flow of polluted combustion gas passing through an interior area of the tempering compartment formed between the inlet and the outlet, wherein the angle $\alpha$ ranges from about 5 degrees to about 90 degrees.

17. The system of claim 1, wherein the plurality of flow vanes extend out downstream from the one or more openings in the plurality of pipes of the first pipe arrangement and the second pipe arrangement.

18. The system of claim 1, wherein the plurality of flow vanes within the second pipe arrangement are misaligned downstream from the plurality of flow vanes within the first pipe arrangement.

19. The system of claim 1, wherein some of the pipes of the first plurality of pipes and the second plurality of pipes are arranged as a grouping of pipes, with each grouping of pipes forming a V shape, and each grouping of pipes spaced apart from an adjacent grouping of pipes, wherein a flow passage for the polluted combustion gas is defined between each of the groupings of pipes.

20. The method of claim 8, wherein each vane of the plurality of flow vanes forms a V shape about a respective one of the one or more openings in the plurality of pipes of the first pipe arrangement and the second pipe arrangement.

* * * * *